United States Patent
Chen

(10) Patent No.: US 9,444,325 B2
(45) Date of Patent: Sep. 13, 2016

(54) SWITCHING REGULATOR COMPATIBLE WITH ELECTRONIC TRANSFORMER AND CONTROL METHOD THEREOF

(71) Applicant: Pei-Yuan Chen, Zhubei (TW)

(72) Inventor: Pei-Yuan Chen, Zhubei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 105 days.

(21) Appl. No.: 14/258,050

(22) Filed: Apr. 22, 2014

(65) Prior Publication Data
US 2014/0320099 A1 Oct. 30, 2014

Related U.S. Application Data

(60) Provisional application No. 61/817,112, filed on Apr. 29, 2013.

(51) Int. Cl.
*H02M 3/156* (2006.01)
*H02M 1/42* (2007.01)

(52) U.S. Cl.
CPC ............ *H02M 1/4225* (2013.01); *Y02B 70/126* (2013.01)

(58) Field of Classification Search
CPC .. H02M 3/156; H02M 1/4225; Y02B 70/126
USPC .......... 323/282, 284, 285, 207, 222; 363/89, 363/84, 90
See application file for complete search history.

(56) References Cited

U.S. PATENT DOCUMENTS

| | | | | | |
|---|---|---|---|---|---|
| 5,777,861 | A | * | 7/1998 | Shimizu | H02M 1/4208 315/209 R |
| 6,075,715 | A | * | 6/2000 | Maehara | H02M 1/425 363/132 |
| 6,324,078 | B1 | * | 11/2001 | Naruo | H02M 7/53871 363/124 |
| 7,639,517 | B2 | * | 12/2009 | Zhou | H02M 3/335 363/21.09 |
| 7,706,161 | B2 | * | 4/2010 | Quazi | H02M 1/425 323/207 |
| 8,427,853 | B2 | * | 4/2013 | Uno | H02M 1/4225 363/125 |
| 8,536,849 | B2 | * | 9/2013 | Wang | H02M 3/156 323/284 |
| 8,564,991 | B2 | * | 10/2013 | Zhang | H02M 1/4225 323/259 |
| 9,083,245 | B2 | * | 7/2015 | Zhao | H02M 3/335 |
| 2011/0292704 | A1 | * | 12/2011 | Makino | H02M 1/4208 363/126 |
| 2013/0301309 | A1 | * | 11/2013 | Chen | H02M 3/33523 363/21.12 |
| 2014/0021879 | A1 | * | 1/2014 | Yu | H05B 33/0839 315/206 |
| 2014/0055107 | A1 | * | 2/2014 | Tsuruoka | H02M 3/02 323/234 |
| 2014/0320099 | A1 | * | 10/2014 | Chen | H02M 1/4225 323/282 |

* cited by examiner

*Primary Examiner* — Timothy J Dole
*Assistant Examiner* — Htet Z Kyaw
(74) *Attorney, Agent, or Firm* — Tung & Associates

(57) ABSTRACT

The present invention discloses a switching regulator compatible with an electronic transformer and a control method thereof. The switching regulator includes: a power stage circuit, a control circuit, and an input current peak & valley setting circuit. The control circuit is coupled to the power stage circuit, for generating an operation signal according to a feedback signal and a peak & valley setting signal, to operate at least one power switch in the power stage circuit, so as to convert a rectified input voltage to an output voltage. The input current peak & valley setting circuit is coupled to the control circuit, for generating the peak & valley setting signal such that in one cycle period, the input current has multiple valleys forming a semi-sinusoidal contour.

8 Claims, 8 Drawing Sheets

SWITCHING REGULATOR COMPATIBLE WITH ELECTRONIC TRANSFORMER AND CONTROL METHOD THEREOF

CROSS REFERENCE

The present invention claims priority to U.S. 61/817,112, filed on Apr. 29, 2013.

BACKGROUND OF THE INVENTION

1. Field of Invention

The present invention relates to a switching regulator compatible with an electronic transformer and a control method thereof; particularly, it relates to such switching regulator and control method thereof wherein an input current is related to a difference between an output voltage and a rectified input voltage.

2. Description of Related Art

FIG. 1A shows a schematic diagram of a prior art switching regulator 100 and an electronic rectifier circuit 110. As shown in FIG. 1A, the switching regulator 100 includes a power stage circuit 10, a control circuit 20, and a feedback circuit 30. The power stage circuit 10 receives a rectified input voltage Vin, and converts the rectified input voltage Vin to an output voltage Vout according to an operation signal GATE. The rectified input voltage Vin is generated by the electronic rectifier circuit 110. The electronic rectifier circuit 110 includes an electronic transformer 40 and a rectifier circuit 50. The electronic transformer 40 receives an AC voltage VAC and converts it to an AC voltage VAC' which has a lower amplitude. The rectifier circuit 50 receives the AC voltage VAC', and rectifies it to generate the rectified voltage Vin. The feedback circuit 30 generates a feedback signal FB according to the output voltage Vout. The control circuit 20 is connected to the feedback circuit 30 to receive the feedback signal FB, and it generates the operation signal GATE according to the feedback signal FB to operate a power switch (not shown, referring to FIGS. 2A-2K) in the power stage circuit 10, so as to convert the rectified input voltage Vin to the output voltage Vout, and to control an input current Iin. The power stage circuit 10 may be a synchronous or asynchronous buck, boost, inverting, buck-boost, inverting-boost, or flyback power stage circuit as shown in FIGS. 2A-2K.

The reason that the electronic rectifier circuit 110 uses the electronic transformer 40 is for decreasing the size of the entire circuitry, such that the switching regulator 100 may be applied in an electronic product such as a wall lamp or a downlight. The electronic transformer 40 converts the AC voltage VAC having a higher amplitude, such as 110V or 220V, to the AC voltage VAC' having a lower amplitude, such as 12V or 14V. The electronic transformer 40 is well known by those skilled in the art, so details thereof are omitted here.

FIG. 1B is a schematic diagram showing signal waveforms of the AC voltages VAC and VAC', the rectified voltage Vin, and the output voltage Vout. In FIG. 1B, the thin solid lines indicate a zero level or a ground level, and the thick solid lines indicate the signal waveforms of the aforementioned signals. As shown in the figure, the AC voltage VAC has a relatively higher amplitude (the amplitudes in the figure are not shown in actual scale). The electronic transformer 40 oscillates with a frequency higher than the AC voltage VAC, and generates the AC voltage VAC' as shown in FIG. 1B. For example, the frequency of the AC voltage VAC is 60 Hz, and the electronic transformer 40 oscillates with a frequency for example of 30 kHz in one cycle period, to generate the AC voltage VAC' having a contour as shown which has a frequency of 120 Hz. The AC voltage VAC' is rectified to the semi-sinusoidal rectified voltage Vin having a frequency of 120 Hz. The output voltage Vout for example has a fixed level.

In the aforementioned prior art switching regulator 100, the power conversion is achieved by switching one or more power switches in power stage circuit 10, and the switching of the power switch determines the input current Iin. To achieve power factor correction (PFC) for better power factor, in this prior art, a typical method is to control the switching of the power switch such that the peaks (Iin_max) of the input current form a contour which is substantially in phase with the rectified input voltage Vin, as indicated by FIG. 1C. However, as a basic requirement of the electronic transformer 40, the peaks of its load current (the input current Iin is the load current of the electronic transformer 40) must be higher than a minimum load current Iload_min, otherwise the electronic transformer 40 does not operate. In this prior art, because it is uncertain as to what kind of electronic transformer 40 and what kind of switching regulator 100 a user might use, and different electronic transformers 40 have different specifications, the peaks (Iin_max) of the input current Iin might be lower than the minimum load current Iload_min, and in some extreme cases, the electronic transformer 40 may not be able to operate in an entire cycle period of the rectified input voltage Vin, resulting in poor compatibility of the switching regulator 100 and the electronic rectifier circuit 110.

In view of above, the present invention proposes a switching regulator compatible with an electronic transformer and a control method thereof.

SUMMARY OF THE INVENTION

From one perspective, the present invention provides a switching regulator compatible with an electronic transformer, for converting a rectified input voltage to an output voltage, wherein the rectified input voltage is generated by an electronic rectifier circuit which includes the electronic transformer and a rectifier circuit coupled to each other, the switching regulator comprising: a power stage circuit, for switching at least one power switch therein according to an operation signal to convert the rectified input voltage to the output voltage, and to control an input current flowing from the electronic rectifier circuit to the switching regulator; a control circuit, which is coupled to the power stage circuit, for generating the operation signal according to a feedback signal and an input current peak and valley setting (P&Vset) signal; and an input current peak and valley setting circuit, which is coupled to the control circuit, for generating the P&Vset signal, wherein the input current has a plurality of peaks and valleys in one cycle period, wherein the plural valleys form a semi-sinusoidal contour, and the plural peaks have a predetermined fixed level higher than the plural valleys or predetermined variable levels higher than the plural valleys.

From another perspective, the present invention provides a control method of a switching regulator compatible with an electronic transformer, for converting a rectified input voltage to an output voltage, wherein the rectified input voltage is generated by an electronic rectifier circuit which includes the electronic transformer and a rectifier circuit coupled to each other, the control method comprising: switching at least one power switch in the switching regulator according to an operation signal to convert the rectified input voltage to the output voltage and control an input current flowing from the electronic rectifier circuit to the switching regulator; generating the operation signal according to a feedback signal and an input current peak and valley setting (P&Vset) signal; and generating the P&Vset signal according to a difference of the output voltage and the rectified input voltage, wherein the input current has a plurality of peaks and valleys in one cycle period, wherein the plural valleys form a semi-sinusoidal contour, and the plural peaks have a predetermined fixed level higher than the plural valleys or predetermined variable levels higher than the plural valleys.

In one preferable embodiment, the power stage circuit turns OFF the power switch for a predetermined fixed time period according to the operation signal.

In one preferable embodiment, the plural peaks in the one cycle period form a semi-sinusoidal contour.

In one preferable embodiment, the input current is related to a difference between the output voltage and the rectified input voltage.

In one preferable embodiment, the input current includes a DC component and a semi-sinusoid component.

The objectives, technical details, features, and effects of the present invention will be better understood with regard to the detailed description of the embodiments below.

DESCRIPTION OF THE PREFERRED EMBODIMENTS

Figure 1A:
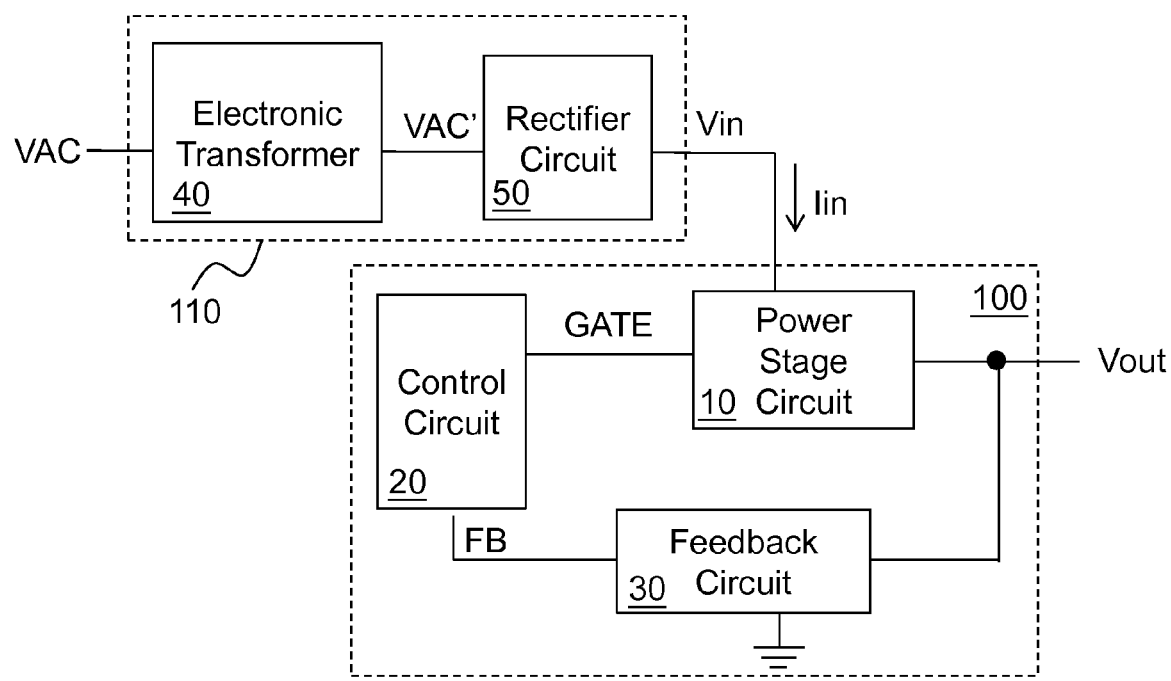
FIG. 1A shows a schematic diagram of a prior art switching regulator 100 and an electronic rectifier circuit 110.
Figure 1B:
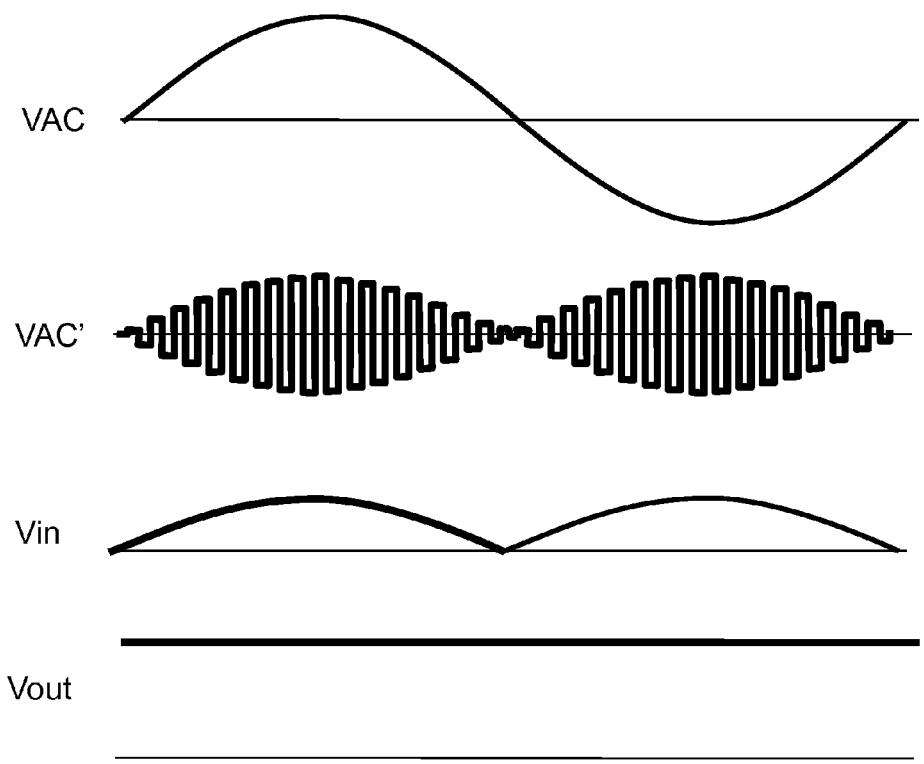
FIG. 1B is a schematic diagram showing signal waveforms of the AC voltages VAC and VAC', the rectified voltage Vin, and the output voltage Vout.
Figure 2A:
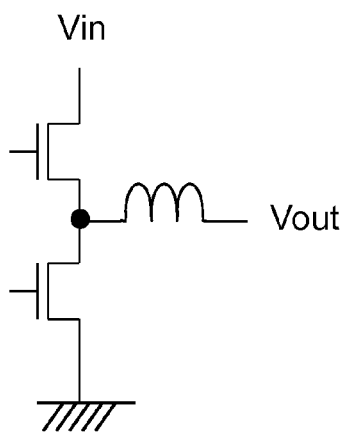
FIGS. 2A-2K show synchronous and asynchronous buck, boost, inverting, buck-boost, inverting-boost, and flyback power stage circuits.
Figure 2B:
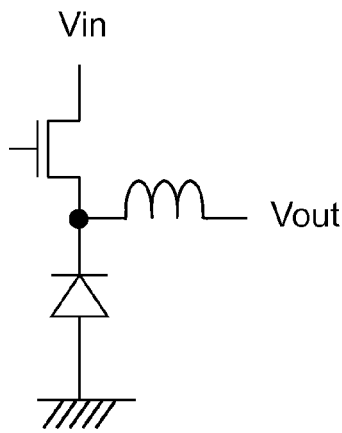
Figure 2C:
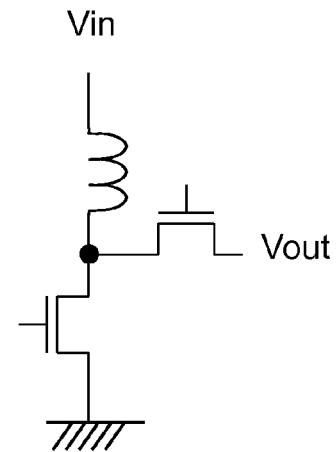
Figure 2D:
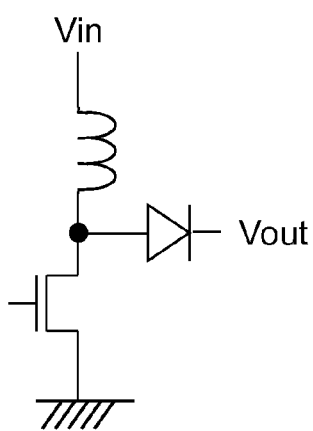
Figure 2E:
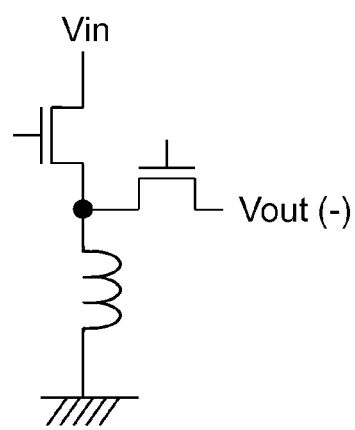
Figure 2F:
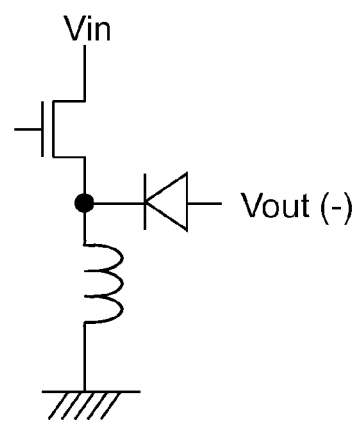
Figure 2G:
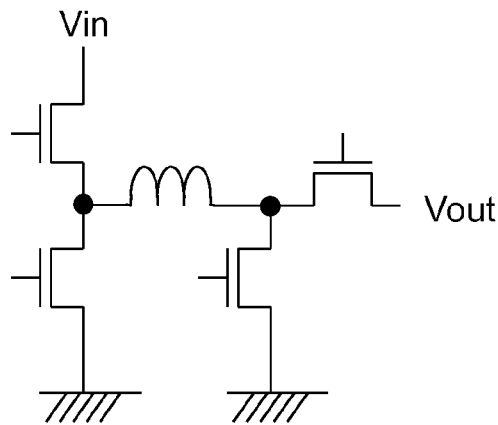
Figure 2H:
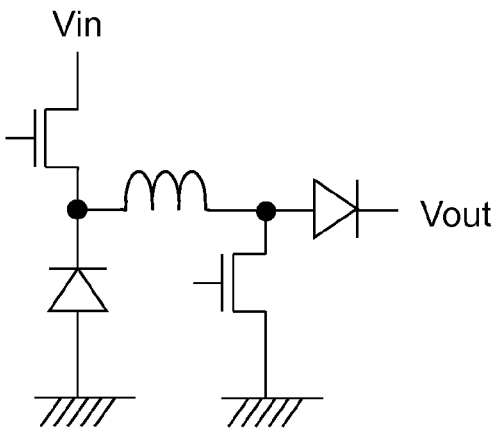
Figure 2I:
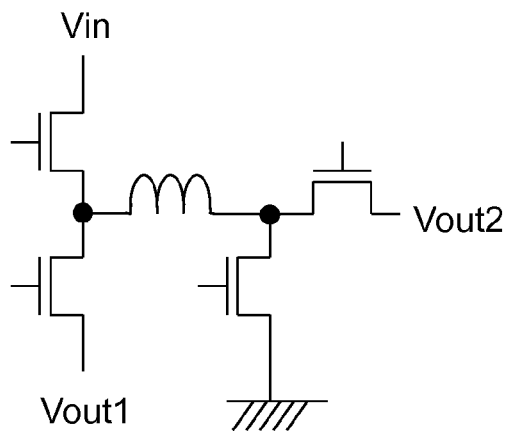
Figure 2J:
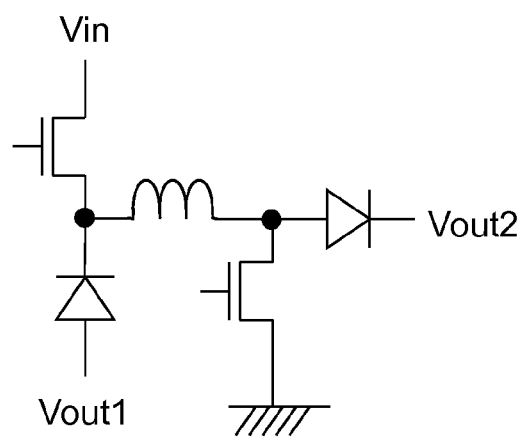
Figure 2K:
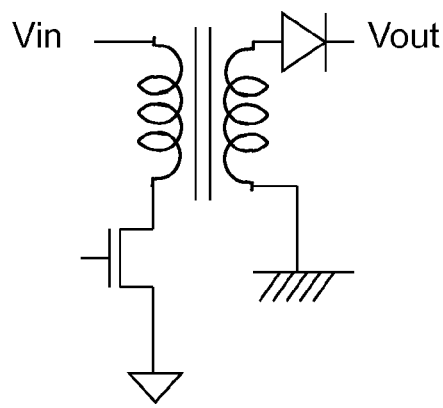
Figure 3:
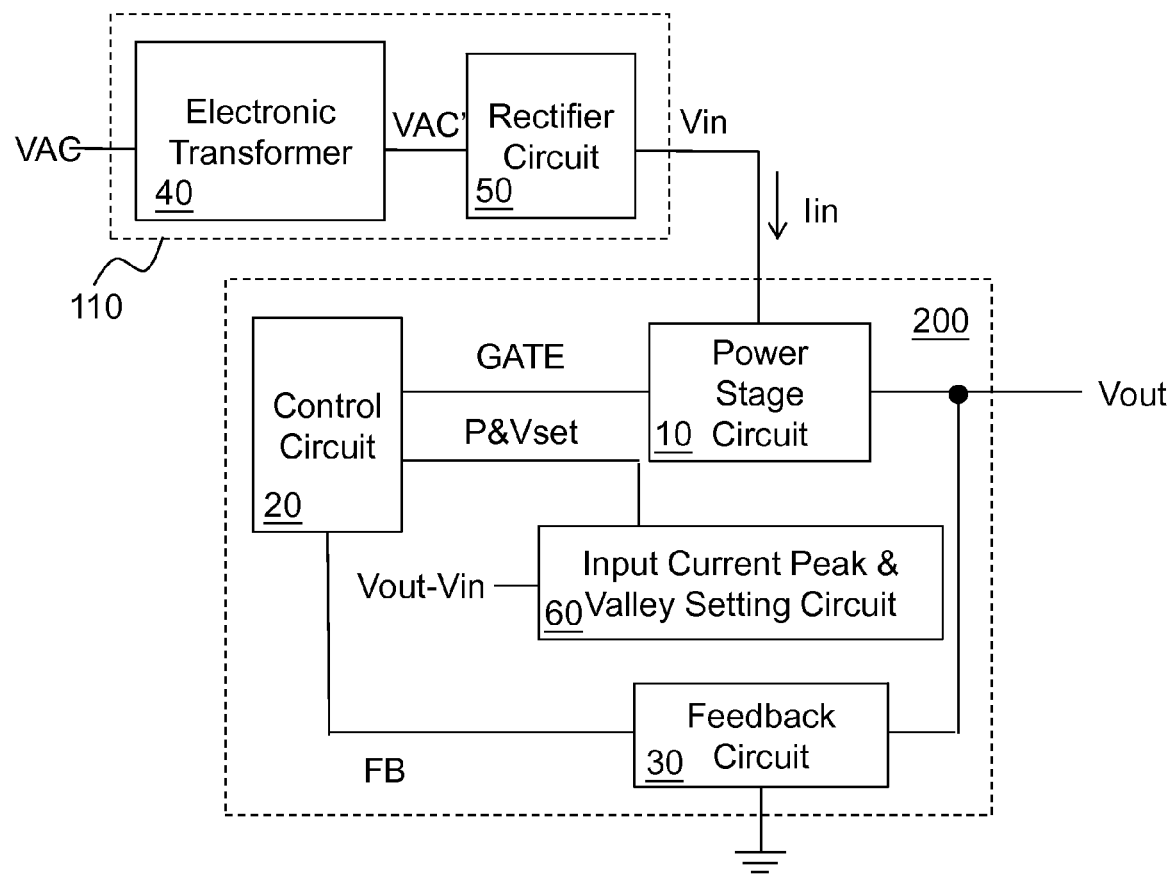
FIG. 3 shows a hardware embodiment of the present invention.

Please refer to FIG. 3 for an embodiment according to the present invention. As shown in FIG. 3, a switching regulator 200 includes a power stage circuit 10, a control circuit 20, a feedback circuit 30, and an input current peak & valley setting circuit 60. The power stage circuit 10 converts the rectified input voltage Vin to the output voltage Vout according to the operation signal GATE, and controls the input current Iin according to the operation of the power switch (not shown in FIG. 3, referring to FIGS. 2A-2K). The electronic rectifier circuit 110 includes the electronic transformer 40 and the rectifier circuit 50. The electronic transformer 40 receives the AC voltage VAC, and converts it to the AC voltage VAC' which has a lower amplitude. The rectifier circuit 50 receives the AC voltage VAC', and rectifies it to generate the rectified voltage Vin. The schematic signal waveforms of the AC voltages VAC and VAC', the rectified input voltage Vin, and the output voltage Vout are shown in FIG. 1B. The feedback circuit 30 generates the feedback signal FB according to the output voltage Vout. The control circuit 20 is coupled to the feedback circuit 30, and it generates the operation signal GATE according to the feedback signal FB, to operate at least one power switch (not shown in FIG. 3, referring to FIGS. 2A-2K), so as to convert the rectified input voltage Vin to the output voltage Vout, and control the input current Iin. If the power stage circuit 10 includes two or more power switches, the operation signal GATE may correspondingly include plural operation signals, as well known by those skilled in the art; therefore, details thereof are omitted here. The power stage circuit 10 is for example but not limited to the synchronous or asynchronous buck, boost, inverting, buck-boost, inverting-boost, or flyback power stage circuit as shown in FIGS. 2A-2K. This embodiment is different from the prior art switching regulator 100 in that, the switching regulator 200 further includes an input current peak & valley setting circuit 60, which is coupled to the control circuit 20, for generating an input current peak and valley setting (P&Vset) signal, to control the input current Iin such that the input current Iin has plural peaks and valleys in one cycle period, wherein the plural valleys form a semi-sinusoidal contour, and the plural peaks have a predetermined fixed level or predetermined variable levels higher than the plural valleys.

In one embodiment, as described in the above, the frequency of the AC voltage VAC is for example 60 Hz; the frequency of the AC voltage VAC' is 120 Hz; and the electronic transformer 40 oscillates by a frequency for example of 30 kHz. Preferably, the power switch of the power stage circuit 10 switches by a frequency of, for example but not limited to, 300 kHz or above. In a preferable embodiment, the power switch of the power stage circuit 10 switches by a frequency at least 10 times higher than the oscillation frequency of the electronic transformer 40.

Figure 4A:
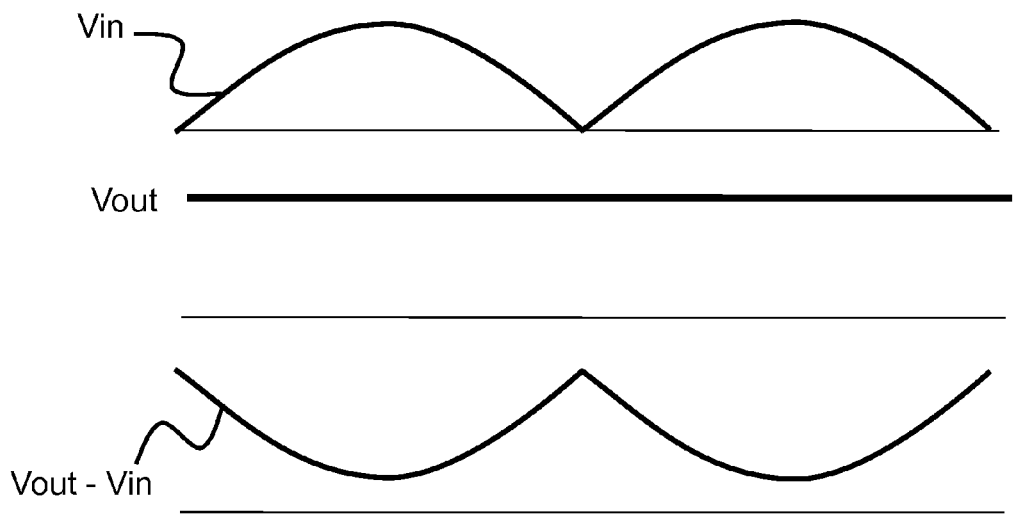
FIG. 4A is a schematic diagram showing signal waveforms of the rectified input voltage Vin, the output voltage Vout, and the voltage difference of Vout−Vin in the present invention.
Figure 4B:
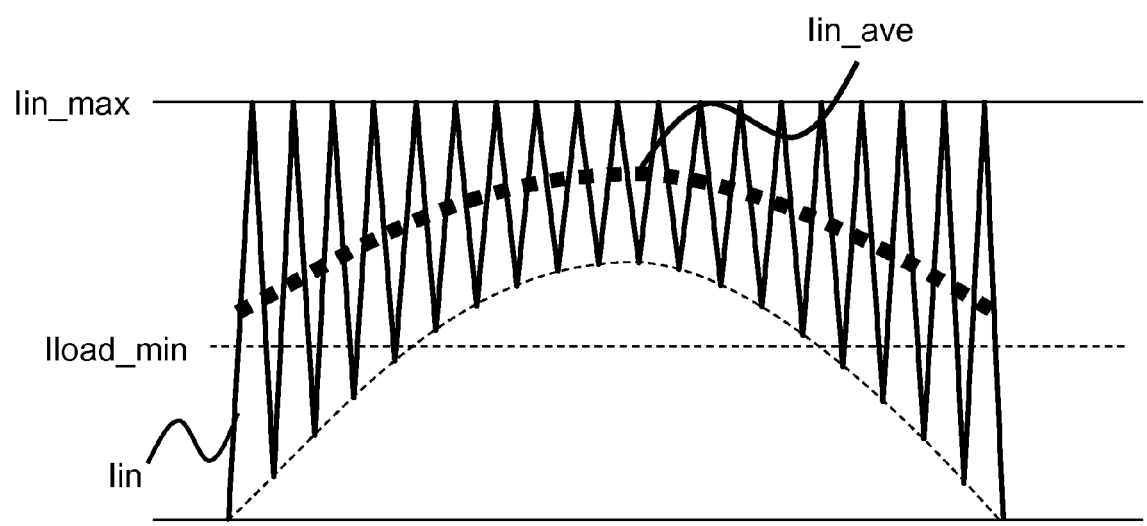
FIG. 4B is a schematic diagram showing signal waveforms of the input current Iin, the peaks Iin_max of the input current Iin, the average Iin_ave of the input current Iin, and the minimum load current Iload_min in an embodiment of the present invention.

Referring to FIG. 4B, the present invention is different from the prior art switching regulator at least in the following aspect. The control circuit 20 generates the operation signal GATE according to a difference of the output voltage Vout and the rectified input voltage Vin, to control the input current Iin such that in one cycle period, the input current Iin has plural valleys, and the plural valleys form a semi-sinusoidal contour. Thus, the switching regulator according to the present invention provides the effect of power factor correction (PFC), while in the mean time the peaks Iin_max of the input current Iin are higher than the minimum load current Iload_min. According to basic operation of the switching regulator 200, when the power switch of the power stage circuit 10 is ON, an inductor in the power stage 10 circuit (referring to FIGS. 2A-2K) storages energy, so that the input current Iin increases; when the power switch in the power stage circuit 10 is OFF, the inductor in the power stage circuit 10 releases energy, so that the input current Iin decreases. Therefore, in one embodiment which is for example but not limiting, the turned-ON and turned-OFF timings of the power switch may be controlled to generate a desired signal waveform of the input current Iin. More specifically, an upper limit of the input current Iin may be set according to a predetermined peak level (in the embodiment of FIG. 4B, the upper limit is constant, but it can be a predetermined variable in another embodiment), and a lower limit of the input current Iin may be set according to the semi-sinusoidal contour (in the embodiment of FIG. 4B, the lower limit is the semi-sinusoid). Thus, the power switch can be turned ON until the input current Iin increases to the peak, and then the power switch is turned OFF so that the inductor of the power stage circuit 10 stops storing energy; and as the input current Iin decreases to the lower limit, the power switch is turned ON so that the inductor of the power stage circuit 10 stops releasing energy. As the diagram shows, even if the specification of the electronic transformer 40 is unknown, the peaks of the input current Iin_max can be easily ensured higher than the minimum load current Iload_min of the electronic transformer 40.

Figure 4C:
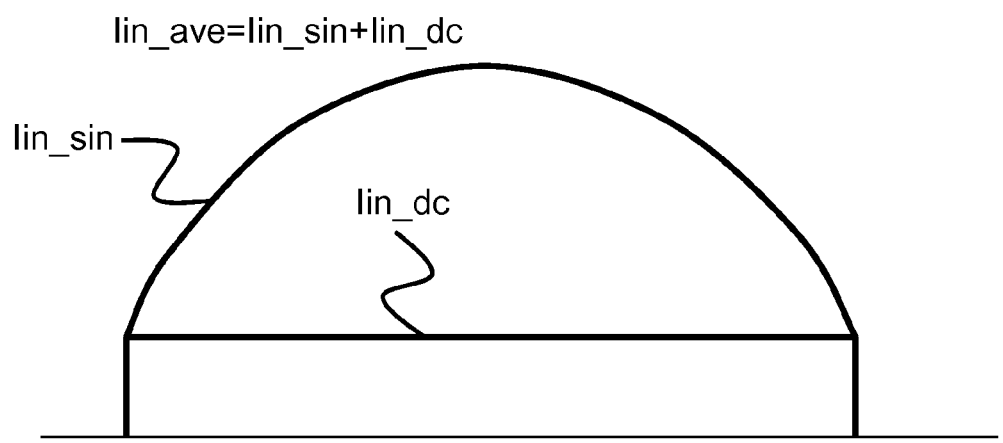
FIG. 4C shows an analysis of the components of the average input current Iin_ave in an embodiment of the present invention.
Figure 4D:
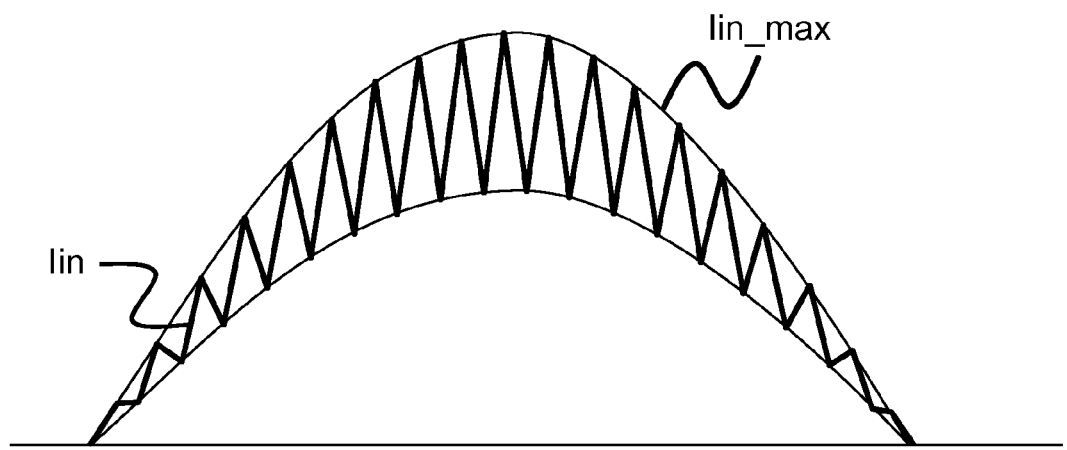
FIG. 4D is a schematic diagram showing signal waveforms of the input current Iin and the peaks Iin_max of the input current Iin in another embodiment of the present invention.

FIG. 4D shows a second embodiment of the present invention. This embodiment is different from the first embodiment in that, the peaks Iin_max of the input current Iin are set to a semi-sinusoid contour (referring to FIG. 4D) instead of a fixed level by the input current peak & valley setting circuit 60, such that the PFC effect may be further improved. To generate the semi-sinusoidal contour of the peaks Iin_max of the input current Iin, it is required to obtain information related to the cycle period or the phase of the rectified input voltage Vin, and such information may be obtained from, for example but not limited to, the input voltage Vin, the AC voltage VAC, the AC voltage VAC', a divided voltage of any of the above, or any signal which has such cycle period information or phase information.

More specifically, as an example, let us assume that the power stage circuit 10 includes the boost power stage circuit as shown in FIG. 2D and the peaks Iin_max of the input current Iin have a fixed level as shown in the first embodiment. The input current Iin flows through the inductor of the boost power stage circuit. The current flowing through the inductor (the inductor current) is: $di=(Vout-Vin) \times dt/L$, wherein di is the inductor current, L is the inductance of the inductor of the boost power stage circuit, and dt is time. Since the inductance L is a constant, and the time dt can be fixed because in the power stage circuit 10, the OFF period of the power switch can be set to a predetermined fixed time, the inductor current di becomes a function of the voltage difference (Vout−Vin), i.e., $di=f(Vout-vin)$. Thus, the input current Iin can be controlled to include plural valleys in one cycle period, and the plural valleys form a semi-sinusoidal contour according to the aforementioned equation as indicated by the dashed semi-sinusoid shown in FIG. 4B.

Certainly, the aforementioned method for forming the semi-sinusoidal contour is only one non-limiting embodiment according to the present invention. For example, in another embodiment, the semi-sinusoidal contour may be formed by detecting the input current or its related signal (such as the inductor current), and comparing the detected signal with reference signals which include the settings of the peaks and the valleys.

Still referring to FIG. 4B, in one cycle period, the input current Iin has plural peaks which have a constant level (Iin_max), and has plural valleys which form the semi-sinusoidal contour. Therefore, the average input current Iin_ave is an average of the peak and the valley which basically has a same phase as the rectified input voltage Vin, as indicated by the thick dashed semi-sinusoid shown in FIG. 4B. Thus, the present invention can improve the power factor. From another perspective, referring to FIG. 4C, the input current Iin shown in FIG. 4B may be divided to two components, wherein one component is a DC component Iin_dc and the other component is a semi-sinusoid component Iin_sin, and the average input current Iin_ave is a sum of the DC component and the AC component.

Figure 1C:
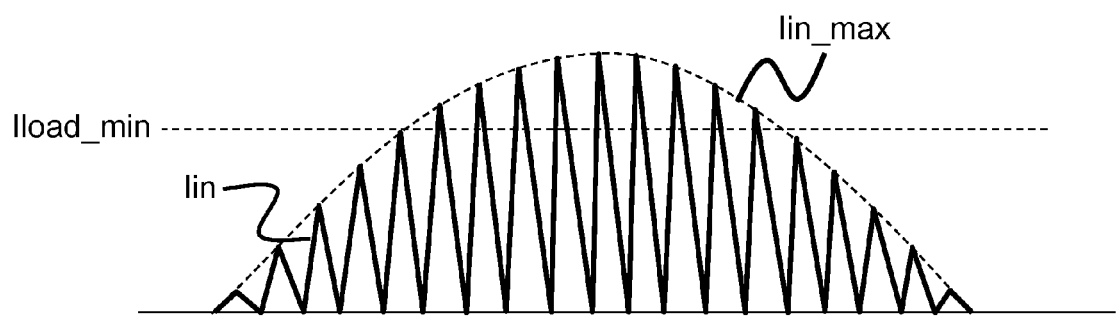
FIG. 1C is a schematic diagram showing signal waveforms of the input current Iin, the peaks (Iin_max) of the input current Iin, and the minimum load current Iload_min in the prior art.

A comparison of FIGS. 1C and 4B shows the advantage of the present invention over the prior art. In the present invention, the semi-sinusoidal contour is formed by the valleys of the input current Iin, and the peaks of the input current Iin are Iin_max which is certainly higher than the valleys, so the peaks of the input current Iin_max can be easily ensured higher than the minimum load current Iload_min of the electronic transformer 40. In the prior art, the semi-sinusoidal contour is formed by the peaks of the input current Iin, and the peaks of the input current Iin_max may very likely be lower than the minimum load current Iload_min of the electronic transformer 40 at least in a portion of one cycle period, and therefore, the switching regulator 100 and the electronic rectifier circuit 110 may not be able to cooperate with each other. In comparison with the prior art, the present invention can improve the compatibility of the switching regulator 200 and the electronic transformer 40.

Figure 4E:
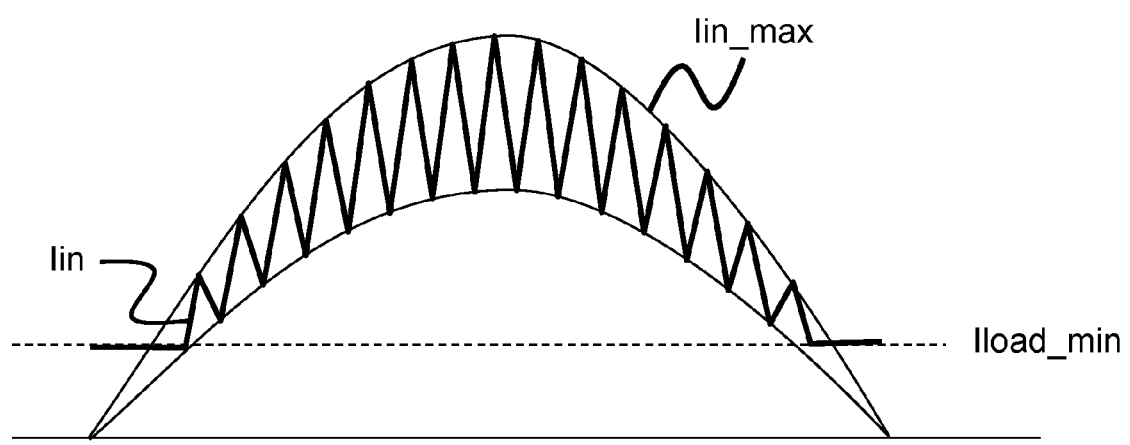
FIG. 4E shows a more specific example of the waveforms.

FIG. 4D shows that the peaks of the input current Iin_max are not limited to the fixed level as shown in FIG. 4B, but may form a semi-sinusoid instead, such that the PFC effect may be further improved. In this case, the peaks of the input current Iin_max might be lower than the minimum load current Iload_min at the beginning and/or the end of one cycle period. According to the present invention, this problem may be solved by keeping the power switch ON at the beginning and/or the end of the cycle period as shown in FIG. 4E.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device or circuit which does not substantially influence the primary function of a signal can be inserted between any two devices or circuits shown to be in direct connection in the embodiments, such as a switch or the like, so the term "couple" should include direct and indirect connections. For another example, the power stage circuit that is applicable to the present invention is not limited to the boost power stage circuit as shown and described in the embodiments above, but may be any synchronous or asynchronous buck, boost, inverting, buck-boost, inverting-boost, or flyback power stage circuit as shown in FIGS. 2A-2K, with corresponding amendments of the circuits or the signals. In view of the foregoing, the spirit of the present invention should cover all such and other modifications and variations, which should be interpreted to fall within the scope of the following claims and their equivalents.

What is claimed is:

1. A switching regulator compatible with an electronic transformer, configured to operably convert a rectified input voltage to an output voltage, wherein the rectified input voltage is generated by an electronic rectifier circuit which includes the electronic transformer and a rectifier circuit coupled to each other, the switching regulator comprising:

a power stage circuit, configured to operably switch at least one power switch therein according to an operation signal to convert the rectified input voltage to the output voltage, and to control an input current flowing from the electronic rectifier circuit to the switching regulator;

a control circuit, which is coupled to the power stage circuit, and configured to operably generate the operation signal according to a feedback signal and an input current peak and valley setting (P&Vset) signal; and an input current peak and valley setting circuit, which is coupled to the control circuit, and configured to operably generate the P&Vset signal, wherein the input current has plural peaks and plural valleys in one cycle period, wherein the plural valleys form a semi-sinusoidal contour, and the plural peaks form a semi-sinusoidal contour wherein the power switch is kept ON at the beginning and/or the end of the cycle period, such that the plural peaks of the input current are higher than a minimum load current of the electronic transformer.

2. The switching regulator of claim 1, wherein the power stage circuit turns OFF the power switch for a predetermined fixed time period according to the operation signal.

3. The switching regulator of claim 1, wherein the input current is related to a difference between the output voltage and the rectified input voltage.

4. The switching regulator of claim 1, wherein the input current includes a DC component and a semi-sinusoid component.

5. A control method of a switching regulator compatible with an electronic transformer, a rectified input voltage to an output voltage, wherein the rectified input voltage is generated by an electronic rectifier circuit which includes the electronic transformer and a rectifier circuit coupled to each other, the control method comprising:

switching at least one power switch in the switching regulator according to an operation signal to convert the rectified input voltage to the output voltage and control an input current flowing from the electronic rectifier circuit to the switching regulator;

generating the operation signal according to a feedback signal and an input current peak and valley setting (P&Vset) signal; and generating the P&Vset signal according to a difference of the output voltage and the rectified input voltage, wherein the input current has plural peaks and plural valleys in one cycle period, wherein the plural valleys form a semi-sinusoidal contour, and the plural peaks form a semi-sinusoidal contour wherein the power switch is kept ON at the beginning and/or the end of the cycle period, such that the plural peaks of the input current are substantially higher than a minimum load current of the electronic transformer.

6. The control method of claim 5, wherein the operation signal turns OFF the power switch for a predetermined fixed time period.

7. The control method of claim 5, wherein the input current is related to a difference of the output voltage and the rectified input voltage.

8. The control method of claim 5, wherein the input current includes a DC and a semi-sinusoid current.

* * * * *